BEST AVAILABLE COPY

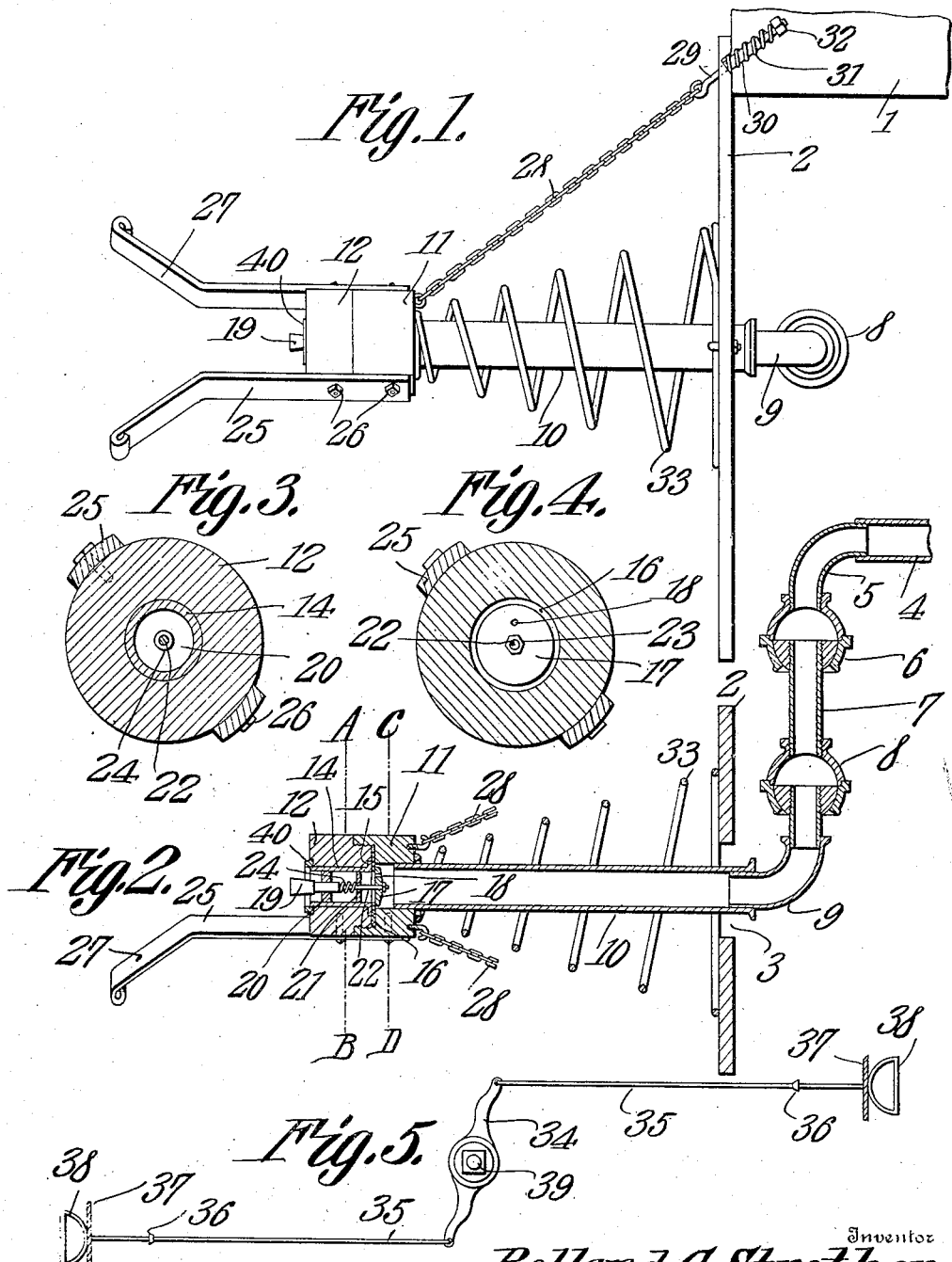

UNITED STATES PATENT OFFICE.

ROLLAND G. STROTHER, OF FINDLAY, OHIO.

AUTOMATIC TRAIN-PIPE COUPLING.

935,944.

Specification of Letters Patent. Patented Oct. 5, 1909.

Application filed May 10, 1909. Serial No. 494,994.

*To all whom it may concern:*

Be it known that I, ROLLAND G. STROTHER, a citizen of the United States, residing at Findlay, in the county of Hancock and State of Ohio, have invented a new and useful Automatic Train-Pipe Coupling, of which the following is a specification.

The objects of the invention are, generally, the provision in a merchantable form of a device of the class above mentioned which shall be inexpensive to manufacture, facile in operation and devoid of complicated parts; specifically, the provision of a head of novel and improved construction; of novel means for maintaining the component parts of the head in a fixed relation with respect to each other; of valve mechanism of novel and improved construction located within said head; of novel means for assembling the head yieldingly with a car body; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood that within the scope of what hereinafter thus is claimed, divers changes in the form, proportions, size, and minor details of the structure may be made without departing from the spirit or sacrificing any of the advantages of the invention.

Similar numerals of reference are employed to denote corresponding parts throughout the several figures of the drawings.

In the accompanying drawings:—Figure 1 shows my invention in side elevation; Fig. 2 is a horizontal section; Fig. 3 is a vertical transverse section on the line A—B of Fig. 2; Fig. 4 is a vertical transverse section on the line C—D of Fig. 2; and, Fig. 5 is a top plan of a means for operating the stop cock.

In the accompanying drawings the numeral 1 denotes, generally, the body of a car provided terminally with a base plate 2 which forms the main supporting element of the device. This base plate 2 is provided with an aperture 3 through which extends a main pipe 10 whereby air is conducted to and from the valve mechanism located within the head of the coupling and hereinafter described in detail.

The numeral 4 denotes a service pipe through which the air is conveyed to the brake mechanism of the car. This service pipe 4 is located out of axial alinement with the main pipe 10 and is terminally provided with an elbow 5 which is duplicated by an elbow 9, assembled with the rear extremity of the main pipe 10. These elbows 5 and 9 extend toward each other and their adjacent terminals carry ball joints, the ball joint of the elbow 5 being denoted by the numeral 6 and the ball joint of the elbow 9 being denoted by the numeral 8. These ball joints 6 and 8 are united by a straight pipe section 7.

The forward extremity of the main pipe 10 is rigidly assembled with a head carrying the valve mechanism, and this head comprises tubular sections 11 and 12 which are threaded terminally to engage each other, the rear extremity of the section 12 being diminished, and the forward extremity of the section 11 being apertured and threaded to receive the said diminished, rearwardly extending portion of the section 12, the arrangement last above described being most clearly shown in Fig. 2. Disposed within the section 12 of the head is a sleeve 14 extending into flush relation with the bearing face of the head, and provided at its rear end, with an out-standing peripheral flange 15 adapted to extend between the adjacent ends of the sections 11 and 12 and to be clamped therebetween, upon the rotation of one of said sections upon the other.

The forward face of the section 12 is provided with an annular channel circumscribing the end of the sleeve 14 and adapted to receive a gasket 40, fashioned from resilient material. This gasket 40 receiving a similar gasket located upon another coupling member similarly formed, serves to effect an air tight union in the train system.

A gasket 16 is provided which is adapted to rest upon the flange 15 of the sleeve, this gasket 16 extending laterally beyond the said flange, so that it may be engaged by the adjacent ends of the sections 11 and 12 and firmly clamped therebetween.

Located within the sleeve 14 are transversely disposed guides 20 and 21. A valve stem 19 is provided, arranged to project forwardly beyond the head, the valve-stem proper being arranged to reciprocate in the forward guide 20. The valve stem 19 terminates rearwardly in a reduced portion 22 which is adapted to reciprocate in the rear guide 21, and this reduced portion 22 is of sufficient length to extend rearwardly beyond the plane of gasket 16. The rear extremity of the portion 22 of the valve-stem carries a valve 17 arranged to engage the gasket 16, and to be supported by the rear end of the sleeve 14. This valve 17 is provided with a bleed hole 18 so that, after the valve 17 has become set as hereinafter described, the air will gradually flow from the service pipe 4 slowly setting the brakes and avoiding any sudden jars incident to a quick application of the same.

The portion 22 of the valve stem may be assembled with the valve 17 by means of a nut 23, and a compression spring 24, preferably helical in form surrounds the reduced portion 22 of the valve stem, and has terminal abutment at its rear extremity with the guide 21, and at its forward extremity, with the rear end of the valve-stem proper 19. The head is provided with forwardly extending arms 25, oppositely disposed, and located approximately 45° from the vertical, these arms 25 being provided with flaring ends 27. The arms 25 extend substantially the entire length of the head and are assembled with the portions 11 and 12 thereof by means of bolts 26 which, extending through the arms 25 engage each of the sections 11 and 12. It has hereinbefore been pointed out that the section 12 of the head is threaded into the section 11, this arrangement giving easy access to the valve mechanism. The valve-mechanism is carried by the portion 12 of the head and by rotating the head 12, the entire valve mechanism may readily be removed for cleaning and for repairs. In order, however, to prevent the portions 11 and 12 of the head from becoming separated at inopportune times the arms 25 are bolted to each of said sections as hereinbefore pointed out, thereby retaining the said sections in a fixed relation with respect to each other.

It is obvious that the construction hereinbefore described and involving the ball and socket joints 6 and 8 permits the head and the main pipe 10 to reciprocate in the aperture 3 of the base plate 2 when a coupling is effected. In order to sustain the pipe 10 and the head in a position operative to effect the coupling, a helical spring 33 is provided, one end of which abuts against the base plate 2, the other end thereof abutting against the rear face of the section 11 of the head. This spring 33 may be of any shape; preferably, however, as shown, it is conoidal in form and disposed about the main pipe 10, the base of the cone determined by the contour of the spring, being in abutment with the base plate, the apex thereof bearing against the head. The conoidal form of the spring 33 enables it to yield laterally to the degree necessary to effect a coupling upon a curve, and when the said spring is compressed its convolutions nest within each other, thereby preventing the said spring from becoming broken through the contact between its convolutions. In order to support further the head and the main pipe 10, a plurality of chains 28 unite the head with the base plate 2, the preferred location of the chains being clearly indicated in Figs. 1 and 2.

The preferred means for assembling the rear ends of the chains 28 with the base plate 2 comprise eye-bolts 29, the shanks of which extend through the base plate 2, the car body 1 being chambered for their reception. Slidably mounted upon the shank of the eye-bolt 29, and located between the base-plate 2 and the nut 32 which is carried by the rear extremity of the eye-bolt, is a sleeve 30, and surrounding this sleeve 30 and having terminal abutment with the base-plate 2 and the nut 32, is a helical compression spring 31. This spring 31, bearing against the nut 32, serves to maintain the chains 28 taut, it being understood that the eye-bolts 29 are slidably mounted in the base-plate 2. The sleeve 30 which is adapted to contact with the nut 32 when the eye-bolt 29 reciprocates in the base-plate, is adapted to prevent the spring 31 from being unduly compressed and broken or "killed".

The air-brake mechanism of a car ordinarily includes a stop-cock located intermediate the ends of the car, and beneath the car. This stop-cock is inconvenient of access, and as an auxiliary to the mechanism hereinbefore described, I have devised simple means whereby this stop-cock may be operated from a point without the rails of the track, the aforesaid mechanism for operating the stop-cock being shown in plan in Fig. 5.

Referring particularly to Fig. 5, I have there denoted generally by the numeral 39, the stop-cock hereinbefore referred to. A yoke 34, comprising oppositely extending arms, is assembled with the stop-cock, oppositely extending rods 35 being terminally assembled pivotally with the terminals of the arms of the yoke. These rods 35 extend transversely of the car body and are provided at their remote ends with hand-holds 38 located at points within easy access from beyond the rails. Hangers 37 depend from the car body, and in these hangers the rods 35 are arranged to reciprocate, stops 36, adapted to contact with the hangers 37, being carried by the rods 35. When it is desired to operate the stop-cock, the hand-hold 38 may be seized, upon either side of the car, and a push or a pull imparted to the rod 35, the stop-cock thereby being opened or closed as may be. The stops 36 contacting with the hangers 37 serve to prevent the stop-cock from being moved into an extreme position.

In Figs. 1 to 4 inclusive I have shown a mechanism whereby a train pipe is adapted to be coupled. It is of course to be understood that each end of the car is to be equipped with a device of the character there shown, the coupling means carried by the opposite ends of the car being identical in every particular.

In practical operation, when two cars equipped with the device of my invention are brought into close relation, the flared ends 27 of the arms 25 will engage and interlock, the extremities of the valve-stem 19 coming into contact, compressing the springs 24, lifting the valves 17 from the gaskets 16 and permitting the air to flow readily through the service pipes 4. While this coupling is being effected the spring 33 will be compressed to a greater or less extent depending upon the force with which the cars have come into contact, the ball joints 6 and 8 permitting the main pipe 10 to reciprocate in the aperture 3 of the base plate. The resiliency of the spring 33, after the cars have been coupled together, will maintain the gaskets 40 and the valve stems 19 in contact with each other, until such time as the cars may become uncoupled.

The train pipe coupling hereinbefore described, is adapted to operate satisfactorily under all conditions of train operation. It will effect a coupling with equal facility whether upon a curve or upon a tangent and after such coupling has been effected, the device will maintain the air-pressure throughout the air-brake system without loss through leakage at points where couplings in the train-pipe are made.

The device is entirely separate from the means whereby the cars are coupled together, and a disarrangement of the coupling mechanism in no way injures the train pipe coupling which I have devised. In case of a train breaking in two, the air-brakes are at once applied, such application however, as hereinbefore pointed out taking place without shock, the perforation 18 in the valve 17 being of the proper dimension to allow the air to escape gradually, creating a service action on the triple valve, thus easily, and gradually applying the brakes.

Having thus described my invention what I claim as new and desire to protect by Letters Patent is:—

1. In a device of the class described, an apertured base plate arranged to be assembled with the end of a car body; a main pipe arranged to reciprocate in the aperture in the base plate; a head assembled with one end of the main pipe; valve mechanism located within the head; a service pipe disposed out of axial alinement with the main pipe; ball and socket joints assembled with the terminals of the main pipe and the service pipe; a pipe section uniting the ball and socket joints; flexible elements uniting the head with the base plate; and a compression spring having terminal abutment with the base plate and the head.

2. A device of the class described comprising an apertured base plate; a main pipe adapted to reciprocate in the aperture of the base plate; a head carried by the extremity of the main pipe; valve mechanism located within the head; an eye-bolt adapted to reciprocate in the base plate; a retaining element carried by the extremity of the eye-bolt; a sleeve arranged to slide upon the eye-bolt and disposed between the base plate and the retaining element; a compression spring surrounding the sleeve and having terminal abutment with the base plate and the retaining element; a flexible element uniting the eye-bolt with the head; and a compression spring having terminal abutment with the head and with the base plate and disposed about the main pipe.

3. In a device of the class described, an apertured base plate; a main pipe adapted to reciprocate in the aperture in the base plate; a head carried by the extremity of the main pipe; valve mechanism located within the head; a service pipe disposed out of axial alinement with the main pipe; ball and socket joints assembled with the extremities of the main pipe and the service pipe; a pipe section uniting the ball and socket joints; an eye-bolt arranged to reciprocate in the base plate; a retaining element carried by the extremity of the eye-bolt; a sleeve arranged to slide upon the eye-bolt between the base plate and the retaining element; a compression spring surrounding the sleeve and having terminal abutment with the base plate and with the retaining element; a flexible element uniting the eye-bolt with the head; and a compression spring having terminal abutment with the base plate and with the head and disposed about the main pipe.

4. In a device of the class described, a head comprising separable tubular sections; a sleeve inclosed within one of the sections; a gasket peripherally inclosed between the ends of the sections and having abutment against the end of the sleeve; transverse guides located within the sleeve; a valve-stem arranged to reciprocate in the guides and to protrude terminally from the head; a valve carried by the stem and arranged to bear against the gasket and supported by the end of the sleeve; a compression spring assembled at one end with the valve-stem and at the other with a guide; a main air-supply pipe assembled with the head;

and means for yieldingly connecting the head and the main air supply pipe with a car body.

5. In a device of the class described, a head comprising separable tubular sections; a gasket inclosed between the ends of the sections; transverse guides located within one of the sections; a valve-stem arranged to reciprocate in the guides and to protrude terminally from the head; a valve carried by the valve-stem and arranged to bear against the gasket; resilient means for holding the valve normally against the gasket; a main air supply pipe assembled with the head; and means for yieldingly connecting the head and the main air-supply pipe with a car body.

6. In a device of the class described, a head comprising separable sections; valve-mechanism assembled with one of said sections; arms projecting beyond the head; means uniting the arms with each of said sections to hold said sections in fixed relation with respect to each other; a main air-supply pipe assembled with the other of said sections; and means for yieldingly connecting the head and the main air supply pipe with a car body.

7. In a device of the class described, a tubular head comprising a pair of separable sections; a sleeve disposed within one of said sections and provided at one end with a peripheral flange arranged to be clamped between the ends of the sections; a gasket disposed between the ends of the sections and arranged to bear upon the flange of the sleeve; transverse guides located within the sleeve; a valve-stem arranged to reciprocate in the guides and to protrude from the head; a valve carried by the valve stem and arranged to bear upon the gasket; a main air supply pipe terminally disposed within the head; and means for yieldingly connecting the main air supply pipe and the head with a car body.

8. In a device of the class described, a tubular head comprising a pair of separable sections; a sleeve disposed within one of said sections and provided at one end with a peripheral flange arranged to be clamped between the ends of the sections; a gasket disposed between the ends of the sections and arranged to bear upon the flange of the sleeve; transverse guides located within the sleeve; a valve stem arranged to reciprocate in the guides and to protrude from the head; a valve carried by the valve-stem and arranged to bear upon the gasket; a main air supply pipe terminally disposed within the head; means for yieldingly connecting the main air supply pipe and the head with a car body; and arms assembled with each of said sections to maintain the same in fixed relation with respect to each other.

In testimony that I claim the foregoing as my own, I have hereto affixed my signature in the presence of two witnesses.

ROLLAND G. STROTHER.

Witnesses:
D. C. ROYCE,
W. A. MORRIS.